United States Patent [19]
Charieras et al.

[11] Patent Number: 5,769,361
[45] Date of Patent: Jun. 23, 1998

[54] EMERGENCY EXIT ACCESSIBLE FROM THE OUTSIDE FOR AN AIRCRAFT COCKPIT

[75] Inventors: Jérôme Charieras, Leguevin; Pascal Chaumel, Plaisance du Touch, both of France

[73] Assignee: Aerospatiale Societe Nationale Industrielle, Paris, France

[21] Appl. No.: 611,548

[22] Filed: Mar. 11, 1996

[30] Foreign Application Priority Data

Mar. 10, 1995 [FR] France .................................. 95 02811

[51] Int. Cl.⁶ ..................................................... B64C 1/14
[52] U.S. Cl. ................................. 244/129.4; 244/129.3; 244/121; 292/DIG. 31
[58] Field of Search ............................... 244/121, 129.3, 244/129.9, 129.5; 292/DIG. 31, DIG. 71, 217, 223

[56] References Cited

U.S. PATENT DOCUMENTS

| | | | |
|---|---|---|---|
| 2,381,966 | 8/1945 | Bishop et al. | 268/46 |
| 2,652,996 | 9/1953 | Yujuico et al. | 244/121 |
| 3,050,790 | 8/1962 | Wakefield | 20/42 |
| 3,571,977 | 3/1971 | Abeel | 244/129.5 |
| 4,375,281 | 3/1983 | Nichols | 244/121 |
| 5,620,212 | 4/1997 | Bourne et al. | 292/DIG. 31 |
| 5,632,516 | 5/1997 | Schwab | 292/DIG. 31 |

FOREIGN PATENT DOCUMENTS

| | | | |
|---|---|---|---|
| 1401692 | 10/1965 | France . | |
| 2560270 | 8/1985 | France | 244/129.5 |
| 713092 | 8/1954 | United Kingdom | 244/129 |
| 8401761 | 5/1984 | WIPO | 244/129.5 |

*Primary Examiner*—Virna Lissi Mojica
*Attorney, Agent, or Firm*—Burns, Doane, Swecker & Mathis, LLP

[57] ABSTRACT

To enable intervention personnel to directly enter from the outside the flight deck or cockpit of an aircraft, e.g. in the case of an accident, it is proposed that a window (14) opening from the inside of the cockpit be transformed into an emergency exit accessible from the outside of the aircraft. For this purpose, addition takes place to the existing mechanisms of a handle (50) placed in a recess (52) opening to the outside, as well as manipulating mechanisms. These mechanisms consist of a first linkage acting on the bolts of the window (14) and a second linkage (72) acting by a roller (106) on a cam surface (108) formed on a lever (32) of the window displacement control mechanism.

18 Claims, 3 Drawing Sheets

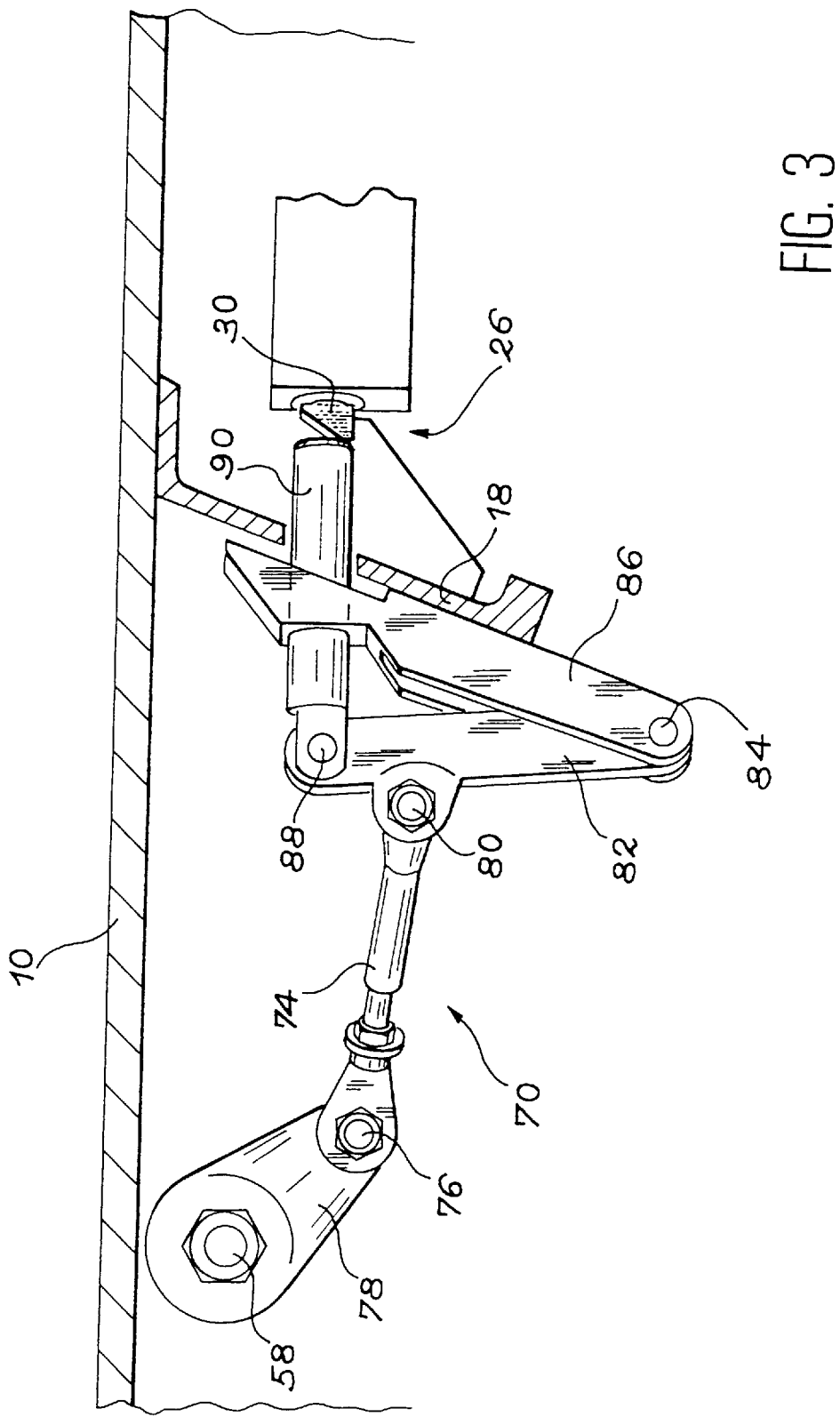

EMERGENCY EXIT ACCESSIBLE FROM THE OUTSIDE FOR AN AIRCRAFT COCKPIT

BACKGROUND OF THE INVENTION

1. Field of the Invention

The invention relates to an emergency exit for the cockpit or flight deck of an aircraft. More specifically the invention is directed at transforming a sash window of the cockpit, which can be manipulated from the inside thereof, into an emergency exit accessible from the outside.

2. Description of Related Art

In existing aircraft, it is not possible to gain direct access to the cockpit from the outside of the aircraft. Aircraft generally have two opening side windows, which can only be manipulated from the interior of the cockpit.

However, it may be useful in the case of an accident to have extra emergency exits enabling an intervention team to directly enter the cockpit from the outside of the aircraft so as to enable the emergency evacuation of the crew.

SUMMARY OF THE INVENTION

The main object of the invention is to satisfy this requirement, without significantly increasing the weight and cost of the aircraft and without causing problems in connection with the reliability of existing mechanisms permitting the opening of side windows from the interior of the aircraft.

According to the invention, this result is achieved by means of an emergency exit acceptable from the outside, for an aircraft cockpit having at least one window movable with respect to a fixed frame, a member for manipulating the window inside the cockpit, and a mechanism for opening the window, actuated by the manipulating member and incorporating at least one locking member and means for controlling the displacement of the window with respect to the fixed frame, characterized in that it also comprises a handle accessible from the outside of the aircraft and which is connected to the window opening mechanism by manipulating means so as to successively control a release of the locking member and an actuation of window displacement control means during a manipulation of the handle.

In a preferred embodiment of the invention, the handle is placed in a recess opening to the outside of the aircraft, said recess being defined to the inside by a sealed bulkhead. Moreover, the handle can pivot to the outside of the aircraft about a pivot pin supported by the sealed bulkhead. A tilting flap, normally kept in the closed position by elastic means, then blocks an access window to the handle on an outer panel of the aircraft.

In this preferred embodiment of the invention, the locking member is a bolt having an element and a catch, the manipulating means then incorporate a first linkage able to act on the end of the bolt element in order to push it out of the bolt catch, as well as a second linkage able to manipulate with a time lag the window displacement control means.

The means for controlling a displacement of the window generally comprise a lever articulated on the window sash by a first pin and on a carriage, received in a slide of the window frame, by a second pin. In this case, the second linkage advantageously has a roller able to bear against a cam surface formed on the lever, following a predetermined travel of the handle, in order to pivot the lever in the window opening direction.

More specifically, the second linkage then comprises a rod, whose ends are respectively articulated on a crank handle or crank integral with the handle and on a second lever carrying the roller and articulated on the window frame.

In a comparable manner, the first linkage advantageously comprises a second rod, whose ends are respectively articulated on a second crank handle or crank integral with the handle and on a third lever articulated on the window frame. This third lever is also articulated on a push rod able to slide in the lock catch, in order to force the bolt element out of the catch during a manipulation of the handle.

To permit regulation of the mechanism according to the invention, each of the rods of the first and second linkages has a regulatable length.

BRIEF DESCRIPTION OF THE DRAWINGS

The invention is described in greater detail hereinafter relative to a preferred, non-limitative embodiment of an emergency exit according to the invention with reference to the attached drawings, wherein show:

FIG. 3 A sectional view along line III—III of FIG. 1.

DETAILED DESCRIPTION OF THE PREFERRED EMBODIMENT

Figure 1:
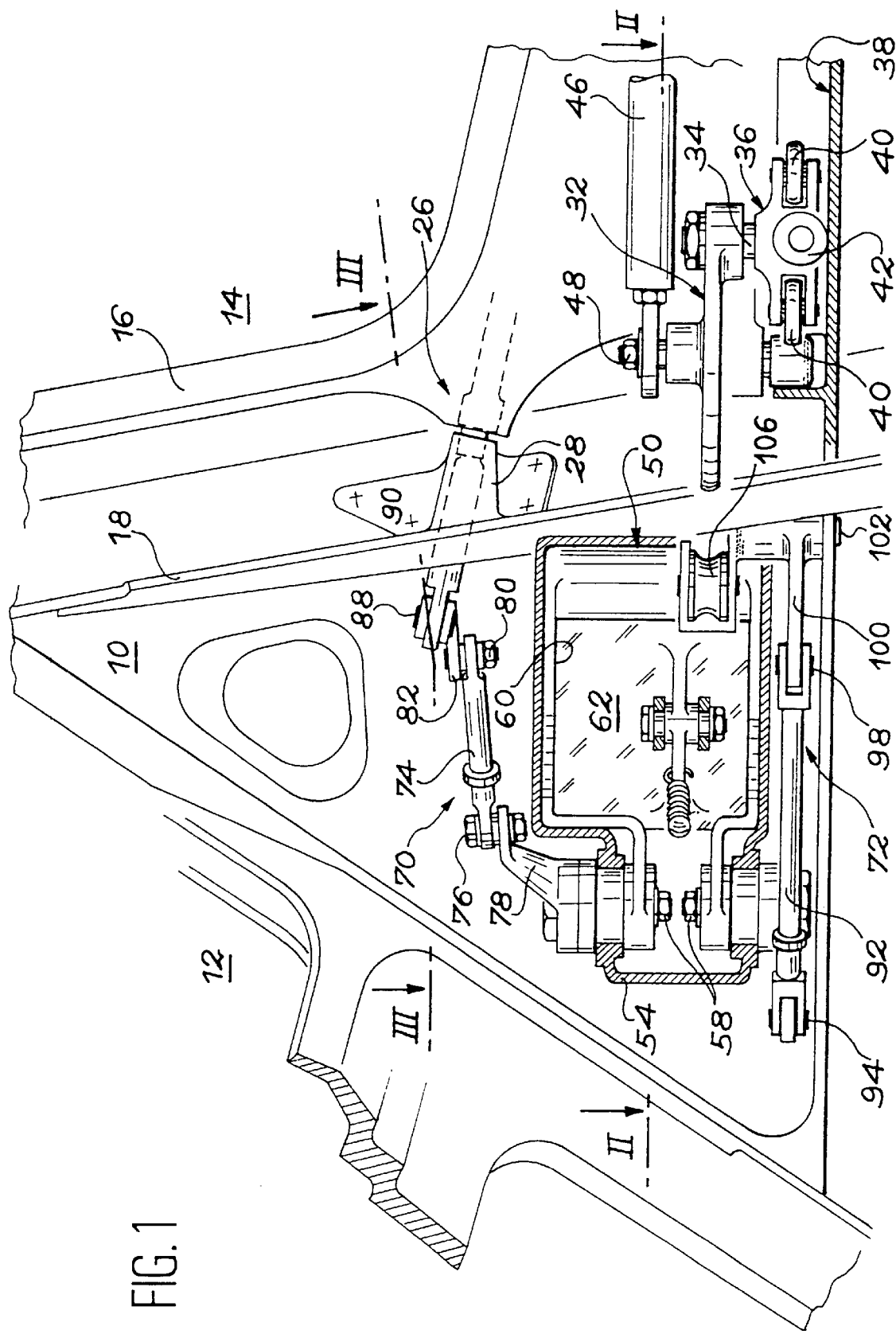
FIG. 1 A view from the interior of an aircraft cockpit, in partial section, illustrating the handle and manipulating means added to an opening side window of the cockpit, in order to transform said window into an emergency exit accessible from the outside and in accordance with the invention.

In the drawings, reference 10 designates the outer panel of an aircraft. The part of said panel 10 illustrated in FIG. 1 is located at the lower level of the windows of the cockpit or flight deck, between the front window 12 and the opening side window 14 on the right-hand side of the aircraft. The opening side window 14 has a sash 16, normally tightly received in a frame 18 fixed to the outer panel 10 in the cockpit.

Figure 2:
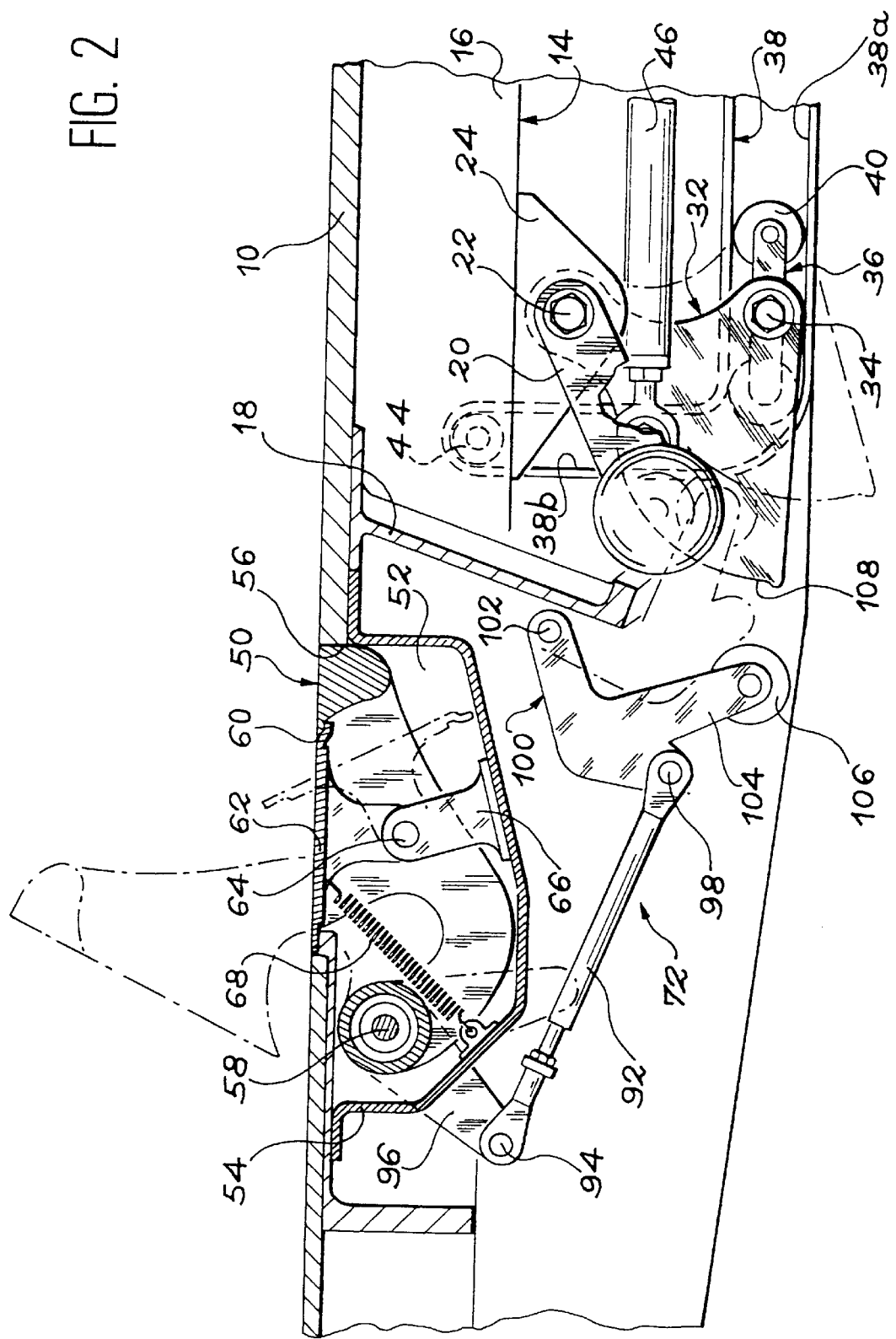
FIG. 2 A sectional view along line II—III of FIG. 1.

In a conventional arrangement, the opening of the side window 14 can be controlled from the interior of the cockpit by a manipulating member constituted by a handle 20 shown in partly torn away form in FIG. 2. The handle 20 has been deliberately omitted from FIG. 1 in order to facilitate the understanding thereof. The handle 20 is installed in sliding and pivoting manner, by a substantially vertical pin 22, on a bracket 24 fixed at the bottom and front of the sash 16 of the opening side window 14.

By means of a known opening mechanism, having a random structure and not forming part of the invention, the handle 20 acts on one or more locking members, as well as on means permitting the displacement of the window 14 with respect to its frame 18 when said members are released. More specifically, the locking members are released by driving in the handle 20, whilst the displacement of the window 14 is controlled by a pivoting of said handle.

One of these locking members, designated in general terms by the reference 26, is represented in FIGS. 1 and 3 in the form of a bolt 26, which has a catch 28 (deliberately omitted from FIG. 3) fixed in the front, lower corner of the frame 18 of the side window 14 and an element 30 fitted in a corresponding part of the sash 16 of the side window 14, so that the end of said element 30 is normally received in the catch 28. Other bolts identical to the bolt 26 are normally provided at one or several other corners of the side window 14. It should be noted that the opening mechanism on which the handle 20 acts incorporates not illustrated, connecting parts by which any displacement of the bolt element leads to an identical displacement of the bolt elements of the other locks. These connecting parts enable the handle 20 to control a simultaneous release of each of the bolts as from the start of a manipulation of the handle 20 in the counterclockwise direction with reference to FIG. 2.

The opening mechanism on which the handle 20 acts also has means for controlling a displacement of the side window 14, whereof only part is illustrated in FIGS. 1 and 2. These control means have a generally known structure, whereof a detailed description is not necessary for understanding the present invention.

The part of said manipulating means illustrated in FIGS. 1 and 2 comprises a pivoting lever 32, located in a substantially horizontal plane and connected in fixed manner to the handle 20 by the pin 22. By means of a pin 34 parallel to the pin 22 said lever 32 carries a carriage 36 received in a slide 38 formed in a horizontal, lower part of the frame 18 of the side window 14. More specifically, the carriage 36 has two vertically axled rollers 40 cooperating with the sides of the slide 38 and at least one horizontally axled roller 42 (FIG. 1) bearing on the bottom of the slide 38.

As can be better seen in FIG. 2, the slide 38 has a straight part 38a extending parallel to the side window 14 and in which is placed the carriage 36. The straight part 38a is displaced towards the inside of the cockpit with respect to the position normally occupied by the pin 22 of the handle 20 when the window is closed. At its front end, the straight part 38a of the slide 38 is extended by a terminal portion 38b oriented towards the outside of the aircraft and essentially forming a right angle with the straight part 38a. A roller 44, whose vertical spindle is carried by the lower beam of the sash 16 of the side window 14 is normally received in the terminal portion 38b of the slide 38.

The means for controlling the displacement of the side window 14 during a manipulation of the handle 20 generally consist of a means identical to that described hereinbefore located between the rear of the lower beam of the sash 16 of the window and the corresponding part of its frame 18. The lever of said second means comparable to the lever 32 is connected to the latter by a small rod 46, whose front end is articulated on the lever 32 by a vertical pin 48 (FIG. 1).

The driving in of the handle 20 firstly controls the release of the bolts locking the side window 14 and in particular the bolt 26. The handle 20 is then manipulated in a counterclockwise direction about its pin 22, in order to control a disengagement of the window from its frame 18 towards the interior of the cockpit under the action of the displacement control means of said window 14, which have just been partly described.

More specifically, the manipulation of the handle 20 results in a pivoting of the lever 32 about the pin 22, which leads to a displacement of the carriage 36 towards the rear within the slide 38.

In view of the fact that the plane passing through the pins 22 and 34 is initially substantially perpendicular to the median plane of the straight part of the slide 38, the first pivoting phase of the lever 32 has essentially no effect on the position of the window 14.

The effect of the continuation of the pivoting of the handle 20 is to make the roller 44 pass over the terminal portion 38b of the slide 38. Therefore the window 14 is progressively moved towards the interior of the cockpit until the roller 44 reaches the straight part 38a of the slide 38. The opening of the window can be continued by moving the latter towards the rear of the aircraft by a sliding of the carriage 36 and the roller 44 in the straight part 38a of the slide 38.

According to the invention, to said known opening mechanisms described hereinbefore are added complimentary mechanisms permitting the transformation of the side window 14 into an emergency exit accessible from the outside.

These complimentary mechanisms mainly comprise a handle 50 accessible from the outside of the aircraft and manipulating means permitting the transmission to the opening mechanism equipping the side window 14 of the movements of the handle 50. Thus, these manipulating means make it possible to successively control a release of the bolts locking the window 14, including bolt 26, as well as an actuation of the previously described control means, ensuring a movement of the window towards the interior of the cockpit and then towards the rear.

As is particularly illustrated in FIG. 2, the handle 50 is placed in a recess 52 defined towards the interior of the cockpit by a sealed bulkhead 54 fixed to the inner face of the outer panel 10 of the aircraft, in a region having a substantially triangular shape located at the bottom and to the front of the frame 18 of the side window 14. This recess 52 opens to the outside by means of an opening 56 made in the outer panel 10.

The handle 50 is articulated on the sealed bulkhead 54, to the front of the recess 52, by a substantially vertical pin 58. In its normal inoperative position illustrated in continuous line form in FIG. 2, the handle 50 has an outer face located in the alignment of the outer face of the panel 10 and blocking the opening 56, so as to ensure the aerodynamic continuity of the structure.

However, the handle 50 has a window 60 desired so as to enable intervention personnel to grasp the handle 50 from the outside of the aircraft. The window 60 is normally closed by a tilting flap 62. The flap 62 is mounted so as to pivot about a vertical pin 64 supported by a bracket 66 fixed to the sealed bulkhead 54 within the recess 52. A helical tension spring 68 is attached by its ends respectively to the tilting flap 62 and to the sealed bulkhead 54, so as to normally maintain said flap in its closed position illustrated in continuous line form in FIG. 2.

As is shown in mixed line form in FIG. 2, a pressure exerted from the outside on the tilting flap 62 enables its pivoting in the clockwise direction towards the interior of the recess 52. The intervention personnel can then grasp the handle 50 in order to pivot it in a counterclockwise direction about its pin 58.

The manipulating means by which the lever 50 acts on the opening mechanism of said window 14 comprise a first linkage 70 used for controlling the release of the locking bolts including the bolt 26 and a second linkage 72 for manipulating the control means partly described hereinbefore and by means of which it is possible to move the window towards the inside of the cockpit.

As illustrated in FIGS. 1 and 3, the first linkage 70 is placed above the sealed bulkhead 54 defining the recess 52. The first linkage 70 comprises a rod 74 of regulatable length and whose front end is articulated by a pin 76 on a crank handle or crank 78 fixed to the handle 50 by a first portion of the pin 58. The rear end of the rod 74 is articulated by a pin 80 on a lever 82. More specifically, the pivot pin 80 of the rod 74 on the lever 82 is located in an intermediate portion of the latter. One end of the lever 82 turned towards the inside of the cockpit is itself articulated by a pin 84 on a bracket 86 fixed to the frame 18 of the opening side window 14. The end of the lever 82 turned towards the outside is articulated by a pin 88 on the end of a push rod 90 received in sliding manner in the catch 28 of the bolt 26. More specifically, there is a clearance between the pin 88 and the lever 82 in the longitudinal direction of the latter, so that a pivoting movement of the lever 82 is transformed into a translatory movement of the push rod 90.

The structure of the linkage 70 described hereinbefore is such that, when the handle 50 occupies its normal closed position illustrated in continuous line form in the drawings, the push rod 90 is sufficiently embedded in the catch 28 to enable the bolt element 30 to freely enter and leave the latter.

However, when the handle 50 is pulled to the outside, as is illustrated in mixed line form in FIG. 2, the resulting pivoting of the crank 78 leads to a rearward displacement of the rod 74, which has the effect of bringing the end of the push rod 90 into a flush position with the end of the catch 28. Thus, if beforehand the element 30 was located in the catch 28, it is automatically pushed towards the outside of the latter at the start of the manipulation of the handle 50. Thus, the crank 78 and rod 74 together form an obtuse angle, which tends to increase when the handle 58 is drawn out of its recess 52, until alignment occurs between the rod and the crank.

Due to the existence, referred to hereinbefore, of connecting parts, which connect the bolt elements in the opening mechanism of the window 14, the backward movement of the elements 30 of the bolt 36 is accompanied by a backward movement of the elements of the other locking bolts equipping the window 14.

As illustrated by FIGS. 1 and 2, the second linkage 72 is mainly located below the bulkhead 54 defining the recess 52 of the handle 50. This second linkage 72 also comprises a rod 92 of regulatable length, whereof a front end is articulated by a pin 94 on a crank 96 joined to the handle 50 by a lower portion of the pin 58. The rear end of the rod 92 is articulated by a pin 98 on a front end of a lever 100. The rear end of said lever is articulated by a pin 102 on the front beam of the frame 18 of the window 14. As is illustrated in FIG. 2, the lever 100 has an arm 104 projecting rearwards and inwards of the cockpit. The arm 104 carries at its end a roller 106. Considered in plan view, the pin of the roller 106 forms a triangle with the pins 98 and 102. More specifically, the pin of the roller 106 is displaced to the rear with respect to the pin 98 and said two pins are displaced towards the inside of the cockpit with respect to the pin 102.

In order that the linkage 72 can act on the control means equipping the window 14 and so as to permit the control of the displacement thereof towards the interior in the manner described hereinbefore, on its edge turned towards the outside and front, the lever 32 has a substantially circular arc-shaped, cam surface 108.

When the handle 50 occupies its normal position corresponding to the closure of the opening side window 14, the arrangement of the linkage 72 is such that the roller 106 is located at a certain distance in front of the cam surface 108 of the lever 32.

When the handle 50 is manipulated, its clockwise pivoting about its pin 58 leads to an identical pivoting of the crank 96 about the same pin and a pivoting of the lever 100 in the counterclockwise direction about the pin 102.

A first phase of this movement has the effect of taking up the clearance initially existing between the roller 106 and the cam surface 108. It is during this first phase that release takes place of the bolts, such as the bolt 26, by means of the first linkage 70.

When the pivoting of the handle 50 about its pin 58 continues, the action of the roller 106 on the cam surface 108 has the effect of pivoting the lever 32 in a counterclockwise direction, as shown in mixed line form in FIG. 2. The pivoting of the lever 32 has effects comparable to that resulting from a pivoting of said same lever due to a manipulation of the handle 20. Consequently, the release of the bolts locking the opening side window 14 is followed by a movement of said window towards the interior of the cockpit.

Once the opening of the window 14 has been started, the intervention personnel outside the aircraft can then completely move back the window towards the interior of the cockpit and then slide it rearwards due to the rolling of the carriage 36 and the roller 44 in the slide 38 and as described hereinbefore.

The above description shows that the invention makes it possible, as a result of very minor modifications to certain existing parts and in particular the lever 32, as well as the addition of a limited number of new parts, to transform any sash window manipulatable from the inside of the cockpit of an aircraft into an emergency exit accessible from the outside of the aircraft. It is therefore possible for intervention personnel to gain access to the cockpit under accident conditions where such an intervention is necessary. It is also important to note that the mechanism according to the invention and which is added to an aircraft sash window to transform it into an emergency exit accessible from the outside only interferes with the opening mechanism normally equipping the window when the handle 50 is manipulated. Consequently, the use of the existing opening mechanism, manipulatable from the interior of the aircraft, is in no way modified by this addition.

Obviously, the structure of the different mechanisms permitting the manipulation of the bolts and for controlling a movement of the window from the outside of the aircraft can assume forms different from those described, particularly as a function of the nature of the opening mechanisms equipping the windows. Moreover, the locking bolt 26 can be replaced by any other locking member such as a hook or the like without passing beyond the scope of the invention.

We claim:

1. An emergency exit accessible from the outside for an aircraft cockpit having at least one window movable with respect to a fixed frame, a manipulating member for the window located within the cockpit, and a window opening mechanism actuated by the manipulating member and incorporating at least one locking member and means for controlling a displacement of the window with respect to the fixed frame, the emergency exit comprising: a handle accessible from the outside of the aircraft and connected to the window opening mechanism by manipulating means so as to successively control a release of the locking member and an actuation of the window displacement control means during a manipulation of the handle, wherein the locking member is a bolt incorporating an element and a catch and the manipulating means incorporate a first linkage able to act on the end of the bolt element in order to force it out of the bolt catch, and a second linkage able to manipulate with a time lag the window displacement control means.

2. The emergency exit according to claim 1, wherein the handle is placed in a recess opening towards the outside of the aircraft, said recess being defined towards the inside of the aircraft by a sealed bulkhead.

3. The emergency exit according to claim 2, wherein the handle is able to pivot towards the outside of the aircraft about a pivot pin supported by the sealed bulkhead.

4. The emergency exit according to claim 1, wherein a tilting flap, maintained in the closed position by elastic means, normally blocks an access window to the handle on an outside panel of the aircraft.

5. An aircraft cockpit including a fixed frame, at least one window capable of sliding movement with respect to the fixed frame, at least one locking member adapted to lock said window relative to the fixed frame, sliding control means for controlling said sliding movement, an inner handle within the cockpit and mounted on the window in such a way that a manipulation of said inner handle directly and successively controls a release of the locking member and an actuation of said sliding control means, the aircraft cockpit comprising: an outer handle mounted on the fixed frame and accessible from the outside of the aircraft in such a way that a manipulation of said outer handle successively controls a release of the locking member and an actuation of the sliding control means, through linkage means mounted on the fixed frame.

6. The emergency exit according to claim 1, wherein the window displacement control means comprise a lever articulated on the window sash by a first pin and on a carriage, received in a slide of the window frame, by a second pin, the second linkage having a roller able to bear against a cam surface formed on the lever, following a predetermined travel of the handle, in order to pivot the lever in a direction corresponding to the opening of the window.

7. The emergency exit according to claim 6, wherein the second linkage comprises a rod, whose ends are respectively articulated on a crank joined to the handle and on a second lever carrying the roller and articulated on the window frame.

8. The emergency exit according to claim 1, wherein the first linkage comprises a second rod, whose ends are respectively articulated on a second crank fixed to the handle and on a third lever articulated to the window frame, said third lever also being articulated on a push rod able to slide in the lock catch.

9. The emergency exit according to claim 7, wherein each rod has a regulatable length.

10. An aircraft cockpit having a fixed frame, a front window, at least one side window movable with respect to the fixed frame, a manipulating member within the cockpit mounted on the side window, a side window operating mechanism operatively connected to the manipulating member and including at least one locking member normally locking said side window in a closed state, and means for controlling a displacement of the side window with respect to the fixed frame, said cockpit comprising: an emergency handle mounted to be accessible on an outside panel of the aircraft, and manipulating means connecting said handle to the side window opening mechanism such that a manipulation of the handle successively controls a release of said locking member and an actuation of the window displacement control means.

11. An aircraft cockpit having a fixed frame, at least one side window movable with respect to the fixed frame, a window operating mechanism including at least one locking member adapted to lock said side window in a closed state and control means for controlling a sliding movement of the side window with respect to the fixed frame, an inner handle within the cockpit mounted on the side window and operatively connected to the window operating mechanism, the aircraft cockpit comprising: an outer handle mounted on the fixed frame and accessible from the outside of the aircraft, said outer handle acting on the locking member through first linkage means and on the control means through second linkage means.

12. The aircraft cockpit according to claim 11, wherein the side window is an emergency exit from the aircraft.

13. The aircraft cockpit according to claim 10, wherein the side window is an emergency exit from the aircraft.

14. The aircraft cockpit according to claim 10, wherein the means for controlling a displacement of the side window controls a sliding movement of the side window.

15. The aircraft cockpit according to claim 5, wherein the window is an emergency exit from the aircraft.

16. The aircraft cockpit according to claim 5, wherein the handle is placed in a recess opening towards the outside of the aircraft, said recess being defined towards the inside of the aircraft by a sealed bulkhead.

17. The aircraft cockpit according to claim 16, wherein the handle is able to pivot towards the outside of the aircraft about a pivot pin supported by the sealed bulkhead.

18. The aircraft cockpit according to claim 5, wherein a tilting flap, maintained in the closed position by biasing means, normally blocks an access window to the handle on an outside panel of the aircraft.

* * * * *